J. D. JONES.
PULLEY.
APPLICATION FILED APR. 28, 1914.

1,174,505.

Patented Mar. 7, 1916.

Witnesses
Chas. E. Richardson
H. P. Roberts

Inventor
John D. Jones
W. E. Schoenborn
By
Attorneys

UNITED STATES PATENT OFFICE.

JOHN D. JONES, OF WALLA WALLA, WASHINGTON, ASSIGNOR OF ONE-HALF TO HENRY C. BAKER, OF WALLA WALLA, WASHINGTON.

PULLEY.

1,174,505.  Specification of Letters Patent.  Patented Mar. 7, 1916.

Application filed April 28, 1914. Serial No. 834,909.

*To all whom it may concern:*

Be it known that I, JOHN D. JONES, a citizen of the United States, residing at Walla Walla, in the county of Walla Walla and State of Washington, have invented certain new and useful Improvements in Pulleys, of which the following is a specification.

The present invention relates to improvements in split pulleys, and has for its objects; first, to provide a hollow hub for split pulleys whereby the latter can be rotatably mounted on a stationary shaft; second, to provide a divided hollow hub which consists of two counterpart sections arranged for interlocking engagement within and coöperating with the split pulleys whereby the lubricating fluid contained in said hollow hub will be sealed against leakage; third, to provide a split pulley having a hollow hub adapted to receive suitable lubricant retaining packings for engagement with the shaft upon which the said hub rotates, and a supply of lubricating fluid designed to be fed through the said packings to said shaft for the purpose of lubricating the pulley; and fourth, to provide a device of the above specified type, which will be comparatively simple and inexpensive to manufacture, reliable and efficient in use and which can be easily and quickly applied to split pulleys of various dimensions.

With the above and other objects in view, the invention consists in the novel features of construction, formations, combinations and arrangements of parts, to be hereinafter more fully described, claimed and illustrated in the accompanying drawings, in which—

Figure 1:
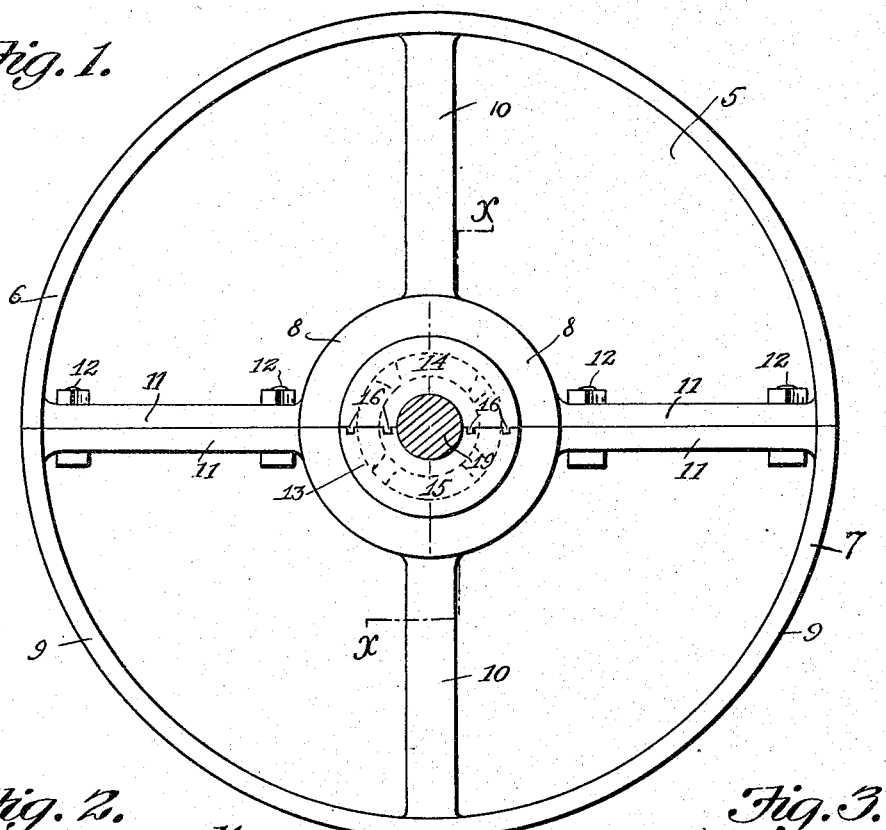
Figure 2:
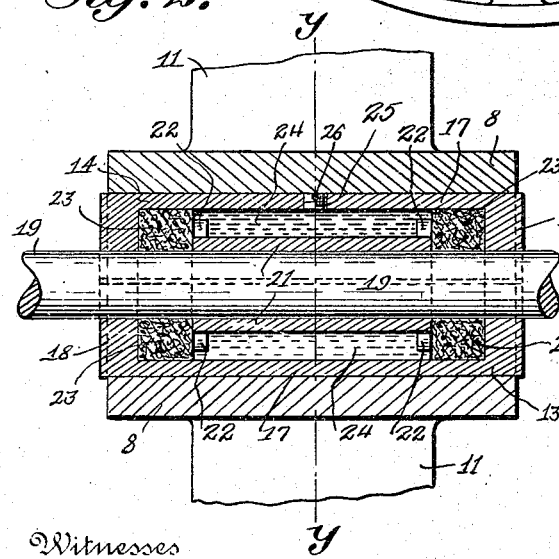
Figure 3:
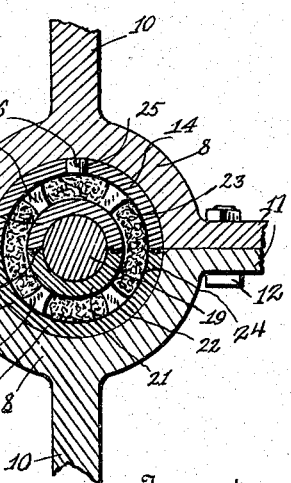

Figure 1 is a side elevation of a split pulley constructed in accordance with my invention; Fig. 2 is a longitudinal sectional view through the bearing thereof, taken on the line X—X of Fig. 1; and Fig. 3 is a transverse sectional view, taken on the line Y—Y of Fig. 2.

Referring to the accompanying drawings, by like characters of reference, throughout the several views, the numeral 5 denotes in general a split pulley comprising two sections 6 and 7 united to form a central annular section 8 and rim 9 connected by the solid spokes 10 and split spokes 11. Fastening elements such as bolts 12 pass through the split spokes 11 and retain the pulley in its rigid and normal position upon its divided hub 13. This hub 13 comprises two counterpart sections 14 and 15, having tongue and groove connection at 16. The said hub is of cylindrical formation consisting of a tubular sectional body portion 17 closed by the opposite ends 18, which are thickened, as shown in Fig. 2, for the purpose of increasing the bearing surface and engagement with the stationary shaft 19, upon which the pulley 5 with its hub 13 is rotatably mounted.

A concentric sectional bearing sleeve 21 is disposed within the tubular body portion 17 of the hub 13, it being held rigid for engagement with the shaft 19 by the spaced webs or lugs 22. The opposite ends of this bearing sleeve 21 terminate short of the ends 18 of the tubular body portion 17, forming chambers designed to receive the packings 23 which close the ends of the oil passage 24 located between the exterior of the sleeve 21 and interior of the body portion 17. This passage may be filled with oil through the opening 25 upon removal of the threaded closure 26.

The pulley is assembled as follows: The packings 23 are first applied, and the sections 14 and 15 of the divided hub 13 applied to the shaft with the tongues and grooves in interlocking engagement. The passage 24 is next filled with oil and the plug 26 positioned to prevent the oil from leaking out of the passage 24. The halves of the pulley 5 are next applied to the hub 13 and clamped rigidly thereon, which holds the sections 14 and 15 of the divided hub 13 in interlocked engagement against displacement.

From the foregoing disclosure it will be obvious that a split pulley with a divided hollow hub is provided which not only has a wide bearing surface in its center section formed by the central sleeve 21, but also at the outer sections by the ends 18, 18, and the lubricant is quickly and uniformly distributed over the entire sections of the sleeve 21 and ends 18, 18, at all times and speeds of the pulley, and fulfil all the necessary requirements of such a device. It should be understood in this connection that various minor changes in the specific details of construction, can be resorted to within the scope of the appended claims, without departing from or sacrificing any of the advantages of the invention.

It will also be seen that by providing the webs 22 at the outer ends of the inner sleeve 21, a firm support is provided for the sleeve 21 and the ends of sleeve 21 are prevented from turning up so as to reduce the contacting surface of the sleeve 21 with shaft 8 and destroy the large bearing on the shaft for said split pulley, as provided in the present invention. Furthermore, by disposing the webs 22 at the outer ends of the sleeve 21, the hollow hub is readily cast without producing any such defects as blow holes, and insures a uniform cooling of the casting and prevents cracks in the finished hollow hub.

What I claim is:—

1. A pulley comprising a divided hollow hub consisting of a cylindrical casing provided with oppositely disposed shaft receiving apertures, and having a concentrically disposed main bearing sleeve within and surrounded by the casing, said casing having separated webs or lugs connecting said bearing sleeve and providing a lubricant containing chamber, and a packing interposed between each end of the sleeve and the adjacent end of the casing.

2. A pulley comprising a divided hollow hub having interlocking tongue and groove connections and consisting of a cylindrical casing provided with oppositely disposed shaft receiving apertures, and having a concentrically disposed main bearing sleeve within and surrounded by the casing, said casing having separated webs or lugs connecting said bearing sleeve and providing a lubricant containing chamber, and a packing interposed between each end of the sleeve and the adjacent end of the casing.

3. A pulley comprising a divided hollow hub consisting of a casing with integral end pieces, a bearing sleeve arranged in said casing between said end pieces and with its ends spaced inwardly therefrom, said bearing sleeve and said end pieces being provided with shaft openings in actual alinement with each other to provide three bearing surfaces, and packings in said casing between the end pieces and the ends of the bearing sleeve, all arranged to provide a fluid lubricant chamber between and communicating with said packings.

4. A pulley comprising a divided hollow hub consisting of a casing with integral end pieces, a bearing sleeve arranged in said casing between said end pieces and with its ends spaced inwardly therefrom, separated webs connecting the ends of the bearing sleeve with the inner sides of the casing, said bearing sleeve and said end pieces being provided with shaft openings in actual alinement with each other to provide three bearing surfaces, and packings in said casing between the end pieces and the ends of the bearing sleeve, all arranged to provide a fluid lubricant chamber between and communicating with said packings.

In testimony whereof I affix my signature in presence of two witnesses.

JOHN D. JONES.

Witnesses:
W. E. SCHOENBORN,
H. P. ROBERTS.

Copies of this patent may be obtained for five cents each, by addressing the "Commissioner of Patents, Washington, D. C."